United States Patent
Sun

(10) Patent No.: US 9,383,616 B2
(45) Date of Patent: Jul. 5, 2016

(54) DISPLAY MODULE AND DISPLAY DEVICE

(71) Applicants: BOE TECHNOLOGY GROUP CO., LTD., Bejing (CN); BEIJING BOE DISPLAY TECHNOLOGY CO., LTD., Beijing (CN)

(72) Inventor: Yanjun Sun, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/549,073

(22) Filed: Nov. 20, 2014

(65) Prior Publication Data
US 2015/0346571 A1    Dec. 3, 2015

(30) Foreign Application Priority Data
May 29, 2014    (CN) .......................... 2014 1 0234013

(51) Int. Cl.
G02F 1/1362 (2006.01)
F21V 8/00 (2006.01)
G02F 1/1333 (2006.01)
G02F 1/1335 (2006.01)
G02F 1/1343 (2006.01)

(52) U.S. Cl.
CPC .......... *G02F 1/136204* (2013.01); *G02B 6/005* (2013.01); *G02B 6/0083* (2013.01); *G02F 1/13439* (2013.01); *G02F 1/133308* (2013.01); *G02F 1/133514* (2013.01); *G02F 2001/133314* (2013.01); *G02F 2202/28* (2013.01)

(58) Field of Classification Search
CPC .................... G02F 1/136204; G02F 1/133514; G02F 1/13439; G02F 1/133308; G02F 2202/28; G02B 6/0083; G02B 6/005
See application file for complete search history.

(56) References Cited

U.S. PATENT DOCUMENTS

2014/0132878 A1*  5/2014  Zhang ................... G06F 1/1601
                                                                349/58

FOREIGN PATENT DOCUMENTS

| CN | 1912698 A | 2/2007 |
|---|---|---|
| CN | 101201485 A | 6/2008 |
| CN | 102162941 A | 8/2011 |
| CN | 102981322 A | 3/2013 |
| KR | 1020070033701 A | 3/2007 |
| KR | 10-1243157 B1 | 3/2013 |

OTHER PUBLICATIONS

1st office action in Chinese application No. 2014102340135 dated Mar. 21, 2016.

* cited by examiner

*Primary Examiner* — Thomas M Sember
(74) *Attorney, Agent, or Firm* — Nath Goldberg & Meyer; Joshua B. Goldberg

(57) ABSTRACT

The invention provides a display module and a display device. The display module comprises a display panel, a backlight module and a glue frame, wherein the display panel comprises a color filter substrate, a light-outputting surface of which is provided with a transparent conductive layer thereon; the backlight module comprises a back plate, which is formed of conductive material; and the glue frame is provided between the display panel and the back plate, and wherein the glue frame is provided with a first opening therein; and the display module comprises a conductive member with a first bent part, a first end of which is attached to the conductive layer by passing through the first opening, a second end of which opposite to the first end is attached to the back plate through the first bent part. The invention can improve the display quality of the display device.

18 Claims, 2 Drawing Sheets

DISPLAY MODULE AND DISPLAY DEVICE

FIELD OF THE INVENTION

The present invention relates to the field of display technology, and particularly, to a display module and a display device.

BACKGROUND OF THE INVENTION

A Thin Film Transistor Liquid Crystal Display (TFT-LCD) is widely applied due to its excellent performance. Generally, the TFT-LCD mainly comprises a liquid crystal display module and a housing, and the liquid crystal display module comprises a liquid crystal display panel, a backlight module and the like. As shown in FIG. 1, the liquid crystal display panel comprises an array substrate 1 and a color filter substrate 2 which are provided opposite to each other, and a liquid crystal layer 3 provided between the array substrate 1 and the color filter substrate 2. The backlight module is used for providing a surface light source with uniform brightness for the liquid crystal display panel, and generally comprises a light-guiding plate 5, a back plate 6 and the like. The liquid crystal display panel is attached and fixed to the back plate 6 through a glue frame 7.

During the course of manufacturing the TFT-LCD, electrostatic charges may be accumulated on the color filter substrate 2 in the process for forming the liquid crystal display panel, and during the working of the TFT-LCD, electrostatic charges may also be accumulated on the color filter substrate 2. If the electrostatic charges accumulated on the color filter substrate 2 cannot be discharged in time, static electricity will occur, and the static electricity may often cause breakdown of the COF (flexible printed circuit board), leading to a poor display such as occurrence of a bright line. In order to discharge the electrostatic charges accumulated on the color filter substrate 2, in the prior art, a transparent conductive layer 4 (such as an indium tin oxide layer) is formed on a light-outputting surface of the color filter substrate 2, and the transparent conductive layer 4 and the back plate 6 (which is made of metal material) are connected by attaching a conductive adhesive tape 8, so that the electrostatic charges may be conducted to the back plate 6 through the conductive adhesive tape 8 and thus discharged through the grounded back plate 6.

The inventor recognizes following problems in the prior art: generally, the conductive adhesive tape is artificially adhered to the transparent conductive layer 4 and the back plate 6, however, since the operation space for the adherence is small, the adherence is time and labor consuming, the accuracy thereof is also low and thus the defect rate of products is high. In addition, the conductive adhesive tape is easily fallen off, especially in a heat circumstance, thus the discharge of electrostatic charges is poor and the display quality is decreased.

SUMMARY OF THE INVENTION

Aiming at the problem that the discharge of electrostatic charges on the color filter substrate is poor and thus the display quality is decreased due to the fact that the conductive adhesive tape between the color filter substrate and the back plate of the existing liquid crystal display is easily fallen off, one object of the invention is to provide a display module and a display device which can excellently discharge the electrostatic charges accumulated on the surface of the color filter substrate.

A solution for solving the above problem is a display module, which comprises a display panel, a backlight module and a glue frame, wherein the display panel comprises a color filter substrate, a light-outputting surface of which is provided with a transparent conductive layer thereon; the backlight module comprises a back plate, which is formed of conductive material; and the glue frame is provided between the display panel and the back plate, and wherein the glue frame is provided with a first opening therein; and the display module comprises a conductive member with a first bent part, a first end of the conductive member is attached to the conductive layer by passing through the first opening, and a second end of the conductive member opposite to the first end is attached to the back plate through the first bent part.

In the invention, the conductive member is connected between the color filter substrate and the back plate of the display module, and the conductive member may be made of metal material and may be bar-shaped or sheet-shaped. The conductive member with the first bent part passes through the first opening, and two ends thereof are attached to the color filter substrate and the back plate respectively, so that the conductive member is connected to the color filter substrate and the back plate more tightly and will not be separated from them easily, thus the electrostatic charges on the color filter substrate may be discharged excellently, therefore, adverse affection to the display module due to the electrostatic charges can be avoided and the display quality of the display module can be improved.

Preferably, the first bent part of the conductive member has a bent angle smaller than 90 degree.

Preferably, the back plate is provided with a second opening therein, and the conductive member is provided with a second bent part, and the second end is attached to the back plate by passing through the second opening by means of the second bent part.

Preferably, the second bent part of the conductive member has a bent angle smaller than 90 degree.

Preferably, the conductive member is sheet shaped.

Preferably, the conductive member is made of stainless steel.

Preferably, the conductive member has a thickness smaller than 0.1 mm.

Preferably, a conductive double-sided adhesive tape is adhered to a surface of the conductive member adjacent to the back plate.

Preferably, the conductive member exhibits ferromagnetism.

A solution for solving the above problem is a display device, which comprises the above display module.

Since the display device in the invention comprises the above display module, the electrostatic charges on the color filter substrate may be discharged excellently, therefore, adverse affection to the display module due to the electrostatic charges can be avoided and the display quality of the display device can be improved.

REFERENCE SIGNS 1. array substrate; 2. color filter substrate; 3. liquid crystal layer; 4. transparent conductive layer; 5. light-guiding plate; 6. back plate; 7. glue frame; 8. conductive adhesive tape; 9. conductive member.

DETAILED DESCRIPTION OF EMBODIMENTS

In order to make the person skilled in the art understand the solutions of the invention better, the technical solutions in the embodiments of the present invention will be described clearly and completely with reference to the accompanying drawings in the embodiments of the present invention. It should be understood that the embodiments described herein are only a part of the embodiments of the present invention, but not the whole embodiments. Based on the embodiments of the present invention, all the other embodiments obtained without making creative efforts by those skilled in the art are within the scope of protection of the present invention.

The First Embodiment

Figure 1:
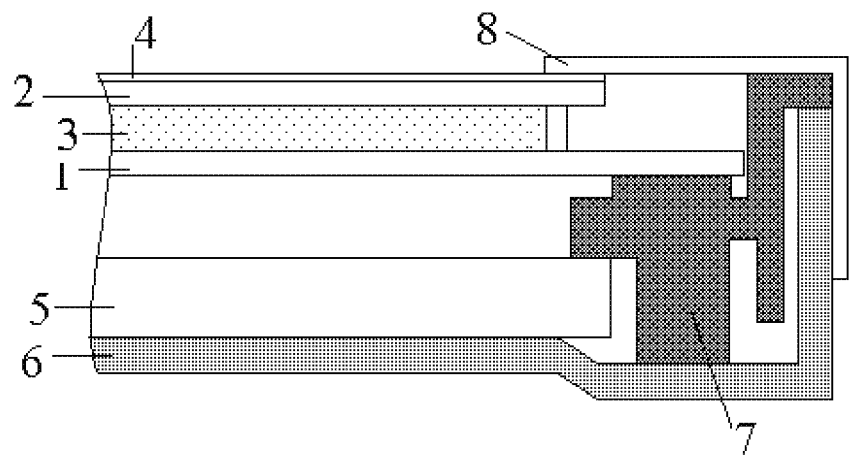
FIG. 1 is a structural diagram illustrating a display module in the prior art.
Figure 2:
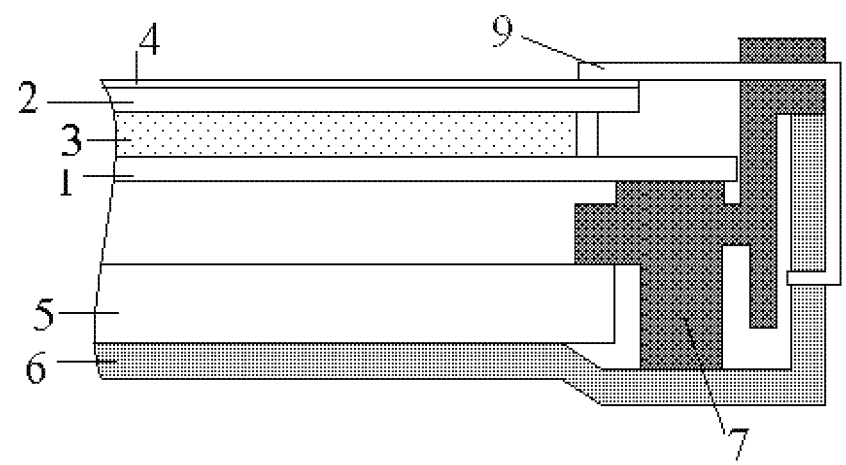
FIG. 2 is structural diagram illustrating a display module according to the first embodiment in the invention.
Figure 3:
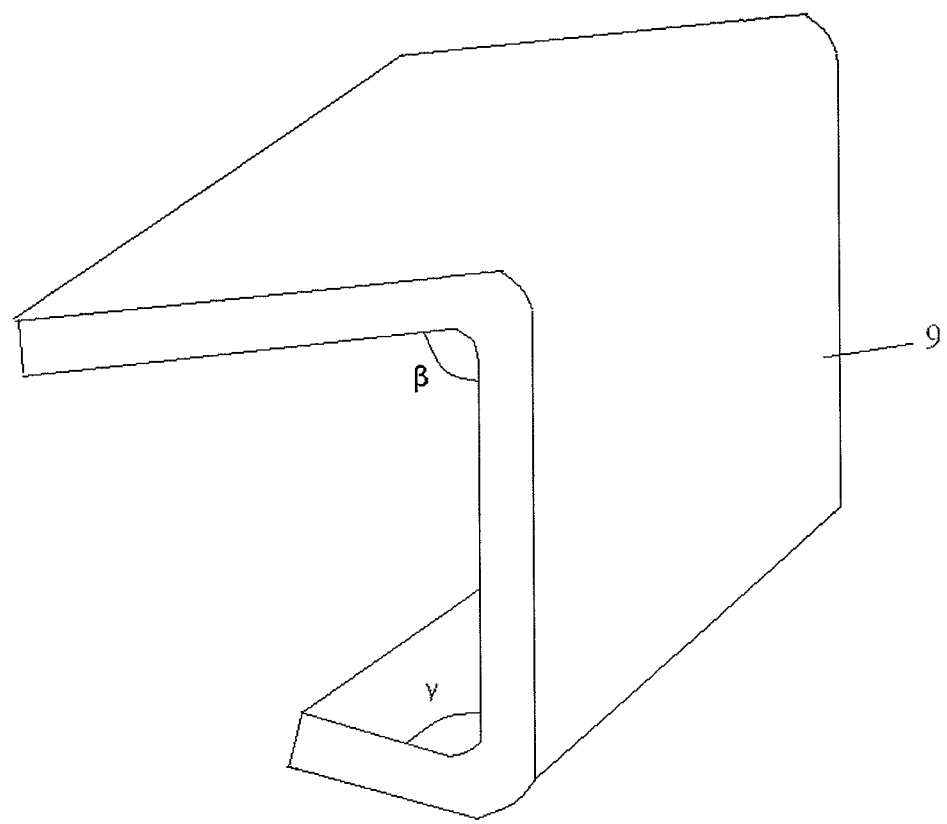
FIG. 3 is structural diagram illustrating a conductive member according to the first embodiment in the invention.

The embodiment provides a display module, as shown in FIG. 2 and FIG. 3, the display module comprises a display panel, a backlight module and a glue frame 7. The display panel comprises a color filter substrate 2 and an array substrate 1 provided opposite to the color filter substrate 2, wherein a liquid crystal layer 3 is provided between the color filter substrate 2 and the array substrate 1, a transparent conductive layer 4 is provided on a light-outputting surface of the color filter substrate 2, the transparent conductive layer 4 may be made of transparent conductive material such as indium tin oxide. The backlight module comprises a back plate 6 and a light-guiding plate 5, and the back plate may be made of conductive material such as metal. The glue frame 7 is provided between the display panel and the back plate 6 for supporting and fixing the display panel, the light-guiding plate 5 and the like.

The glue frame 7 is provided with a first opening therein. The display module further comprises a conductive member 9 which has a first bent part, a first end of the conductive member 9 is attached to the transparent conductive layer 4 by passing through the first opening, a second end of the conductive member 9 opposite to the first end is attached to the back plate 6, and the back plate 6 is grounded. Thus, the electrostatic charges accumulated on the color filter substrate 2 can be excellently conducted to the back plate 6 through the conductive member 9.

In order to further excellently conduct the electrostatic charges accumulated on the color filter substrate 2, contact area between the conductive member 9 and the transparent conductive layer 4 and contact area between the conductive member 9 and the back plate 6 can be increased. Therefore, the conductive member 9 is preferably of sheet-shaped. Of course, the object of the invention may also be achieved by making a bar-shaped conductive member 9.

As shown in FIG. 3, in order to attach the conductive member 9 to the transparent conductive layer 4 and the back plate 6 more tightly, preferably, a bent angle $\beta$ of the first bent part of the conductive member 9 is smaller than 90 degree, that is to say, the conductive member 9 is manufactured so that the bent angle $\beta$ of the first bent part of the conductive member 9 is smaller than 90 degree. After the conductive member 9 is mounted to the display module, the bent angle $\beta$ of the first bent part of the conductive member 9 becomes approximately 90 degree, that is, the bent angle $\beta$ at this time becomes bigger than before mounting. Since the conductive member 9 are generally made of rigid material, after the conductive member 9 is mounted to the display module, a resilience is generated in the conductive member 9 due to the rigidity of the conductive member 9 after the bent angle becomes bigger, so as to attach the conductive member 9 to the transparent conductive layer 4 and the back plate 6 more tightly, thus it is hard for the conductive member 9 to separate from the transparent conductive layer 4 and the back plate 6, and the electrostatic charges accumulated on the color filter substrate 2 can be excellently conducted.

In the embodiment, preferably, the back plate 6 is provided with a second opening therein, and the conductive member 9 is provided with a second bent part, the second end is attached to the back plate 6 by passing through the second opening by means of the second bent part.

Further preferably, as shown in FIG. 3, a bent angle $\gamma$ of the second bent part of the conductive member 9 is smaller than 90 degree, that is to say, the conductive member 9 is manufactured so that the bent angle $\gamma$ of the second bent part of the conductive member 9 is smaller than 90 degree, aim of which is the same as that of the bent angle $\beta$ of the first bent part.

In the embodiment, the conductive member 9 is preferably made of stainless steel. Further preferably, the thickness of the conductive member 9 is equal to or smaller than 0.1 mm, for example, the conductive member 9 may be made of SUS steel plate, the thickness of which is equal to or smaller than 0.1 mm.

The sizes of the first opening and the second opening may be determined according to the material and size of the conductive member 9 and other specific circumstances. In production, for example, when the conductive member 9 is manufactured by using the SUS steel plate, preferably, the lengths of the first opening and the second opening are 10 mm and the widths thereof are 0.2 mm.

In the embodiment, in order to fix the conductive member 9 to the transparent conductive layer 4 and the back plate 6 more tightly, preferably, a conductive double-sided adhesive tape (not shown in drawings) is adhered to a surface of the conductive member 9 adjacent to the back plate 6, that is, the conductive member 9 and the back plate 6 are adhered to each other by using the conductive double-sided adhesive tape so that they can be fixed to each other more tightly. Alternatively, the conductive member 9 may be of ferromagnetism, which may be achieved by plating magnetic material on the conductive member 9 or adhering a magnet to the surface of the conductive member 9 contacting the back plate 6. Thus, due to the magnetic field, the conductive member 9 and the back plate 6 attract each other so that the fixation between the conductive member 9 and the back plate 6 may be further enhanced.

In the embodiment, the conductive member 9 is provided between the color filter substrate 2 and the back plate 6 of the display module, the conductive member 9 may be made of metal material and may be sheet-shaped, and the conductive member 9 has a first bent part, or in addition, has a second bent part; two ends of the conductive member 9 are attached to the transparent conductive layer 4 on the color filter substrate 2 and the back plate 6 respectively, so that the conductive member 9 can be connected to the color filter substrate 2 and back plate 6 tightly and will not be fallen off from them easily, thus the electrostatic charges on the color filter substrate 2 may be discharged excellently, therefore, adverse affection to the display module due to the electrostatic charges can be avoided and the display quality of the display module can be improved.

The Second Embodiment

The embodiment provides a display device, which comprises the display module in the first embodiment, and of course, in addition, it also comprises other known structures such as a power supply unit and a driving control unit, which will not be described in detail herein.

The display device in the embodiment may be a liquid crystal display device, and in addition, it may be: any product or component with a display function, such as electronic paper, a mobile phone, a tablet computer, a television, a display, a notebook computer, a digital photo frame and a navigator.

The display device in the embodiment comprises the display module in the first embodiment, therefore, the electrostatic charges on the surface of the color filter substrate may be discharged excellently, adverse affection to the display module due to the electrostatic charges can be avoided and the display quality of the display module can be improved.

It should be understood that the embodiments above are just exemplary embodiments of the present invention to describe the principle of the present invention, and the present invention is not limited thereto. Any person skilled in the art can make various changes and substitutions without departing from the spirit and substance of the present invention, which should be considered to be within the protection scope of the present invention.

The invention claimed is:

1. A display module comprising a display panel, a backlight module and a glue frame, wherein
the display panel comprises a color filter substrate, a light-outputting surface of which is provided with a transparent conductive layer thereon; the backlight module comprises a back plate, which is formed of conductive material; and the glue frame is provided between the display panel and the back plate, and wherein
the glue frame is provided with a first opening therein; and the display module comprises a conductive member with a first bent part, a first end of the conductive member is attached to the conductive layer by passing through the first opening, and a second end of the conductive member opposite to the first end is attached to the back plate through the first bent part.

2. The display module of claim 1, wherein the first bent part of the conductive member has a bent angle smaller than 90 degree.

3. The display module of claim 1, wherein the back plate is provided with a second opening therein, and the conductive member is provided with a second bent part, and the second end is attached to the back plate by passing through the second opening by means of the second bent part.

4. The display module of claim 3, wherein the second bent part of the conductive member has a bent angle smaller than 90 degree.

5. The display module of claim 1, wherein the conductive member is sheet-shaped.

6. The display module of claim 5, wherein the conductive member is made of stainless steel.

7. The display module of claim 1, wherein the conductive member has a thickness equal to or smaller than 0.1 mm.

8. The display module of claim 1, wherein a conductive double-sided adhesive tape is adhered to a surface of the conductive member adjacent to the back plate.

9. The display module of claim 1, wherein the conductive member exhibits ferromagnetism.

10. A display device comprising a display module, wherein the display module comprises a display panel, a backlight module and a glue frame, and wherein
the display panel comprises a color filter substrate, a light-outputting surface of which is provided with a transparent conductive layer thereon; the backlight module comprises a back plate, which is formed of conductive material; and the glue frame is provided between the display panel and the back plate, and wherein
the glue frame is provided with a first opening therein; and the display module comprises a conductive member with a first bent part, a first end of the conductive member is attached to the conductive layer by passing through the first opening, and a second end of the conductive member opposite to the first end is attached to the back plate through the first bent part.

11. The display device of claim 10, wherein the first bent part of the conductive member has a bent angle smaller than 90 degree.

12. The display device of claim 10, wherein the back plate is provided with a second opening therein, and the conductive member is provided with a second bent part, and the second end is attached to the back plate by passing through the second opening by means of the second bent part.

13. The display device of claim 12, wherein the second bent part of the conductive member has a bent angle smaller than 90 degree.

14. The display device of claim 10, wherein the conductive member is sheet-shaped.

15. The display device of claim 14, wherein the conductive member is made of stainless steel.

16. The display device of claim 10, wherein the conductive member has a thickness equal to or smaller than 0.1 mm.

17. The display device of claim 10, wherein a conductive double-sided adhesive tape is adhered to a surface of the conductive member adjacent to the back plate.

18. The display device of claim 10, wherein the conductive member exhibits ferromagnetism.

* * * * *